United States Patent [19]

Renaux

[11] 4,018,410
[45] Apr. 19, 1977

[54] METHOD FOR THE OPTIMIZED TRANSPORTATION OF PASSENGERS OR OBJECTS

[75] Inventor: Charley Renaux, Jouques, France

[73] Assignee: Halberthal S.A., Terville, France

[22] Filed: Dec. 30, 1974

[21] Appl. No.: 537,461

[30] Foreign Application Priority Data

Jan. 11, 1974 France .............................. 74.01066

[52] U.S. Cl. .................................... 246/5; 104/88
[51] Int. Cl.² ......................................... B61L 27/04
[58] Field of Search ............ 104/88, 178, 184, 195, 104/238, 239; 246/3, 4, 5; 235/150.24

[56] References Cited

UNITED STATES PATENTS

| 520,364 | 5/1894 | Kratz | 104/184 |
|---|---|---|---|
| 743,381 | 11/1903 | Gunckel | 104/239 |
| 926,058 | 6/1909 | Fouts | 104/184 |
| 3,211,907 | 10/1965 | Blaisdell | 246/4 |
| 3,426,701 | 2/1969 | Braun | 104/178 |
| 3,805,704 | 4/1974 | Schauffler | 104/88 |

Primary Examiner—Trygve, M. Blix
Assistant Examiner—Reinhard J. Eisenzopf
Attorney, Agent, or Firm—Diller, Brown, Ramik & Wight

[57] ABSTRACT

The vehicles are moved in continuous manner in the same direction, on orders of a computer given only before their departure, fixing an itinerary optimized as a function of the congestion anticipated at each section of the network. The network comprises several one-way closed circuit routes, having common zones between convergent and divergent stretches, wherein each of said routes is traversed in one-way sense by guide-marking elements having between themselves, a controlled spacing called the pitch. In the zone common to any two of the routes, the marking elements have the same direction with an interconnected pitch P and speed V, and are shifted in the common zone, from one route to the other, and serve as pilots for the vehicles keyed on them by a servo system during their passage over one route. The vehicles possess a device permitting possible changing of the line of marking elements (hence of the route). A counter is fixed at the exit from each divergent stretch to detect the position of the vehicles with respect to the marking elements of each route, then to control the servo system for resetting the keying (distribution) of the vehicles on said marking elements. Fixed signals (pins) enable the execution at a suitable moment according to a defined program, of the order to change line of marking elements, at the same time as the order for changing routes. The routes have also means for executing the order of possible rekeying of the vehicle, given by the counter.

1 Claim, 22 Drawing Figures

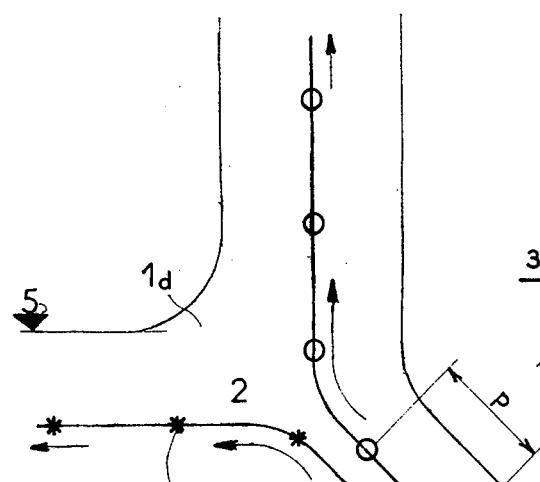
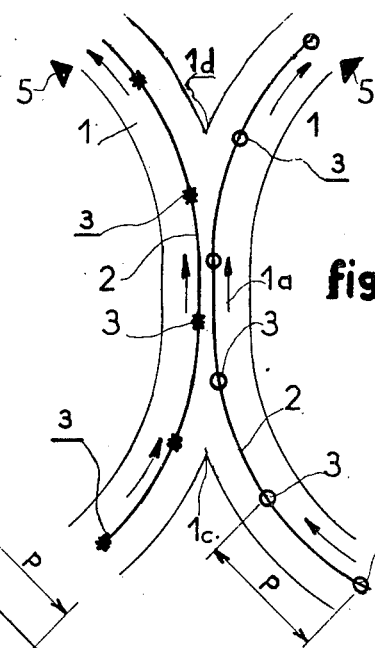
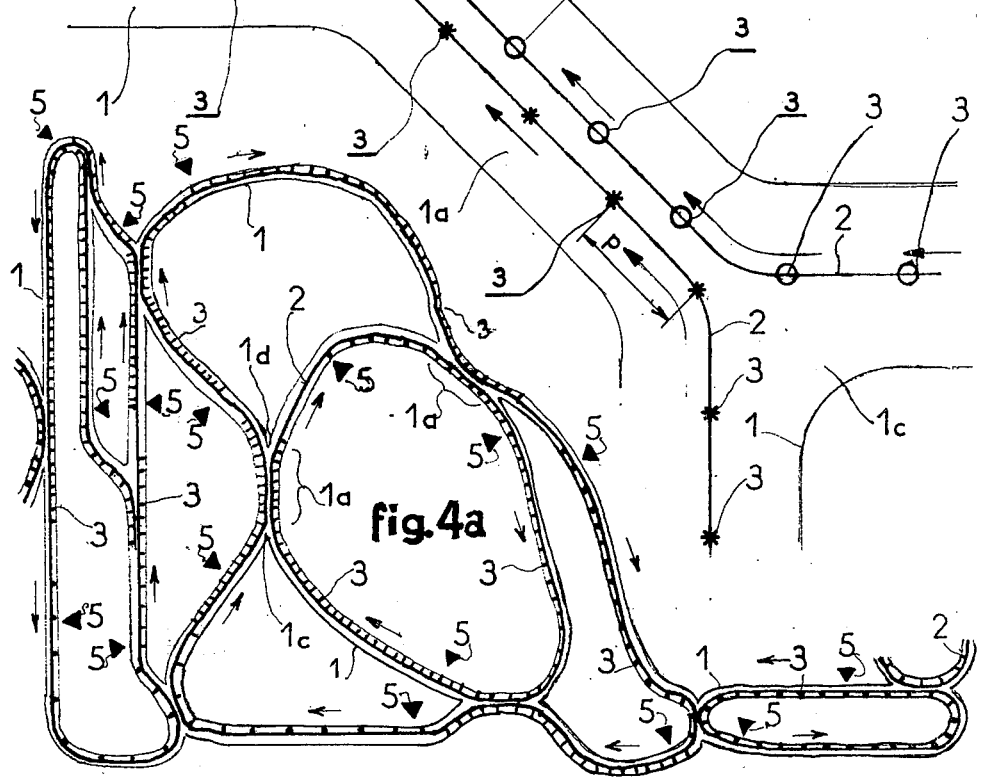

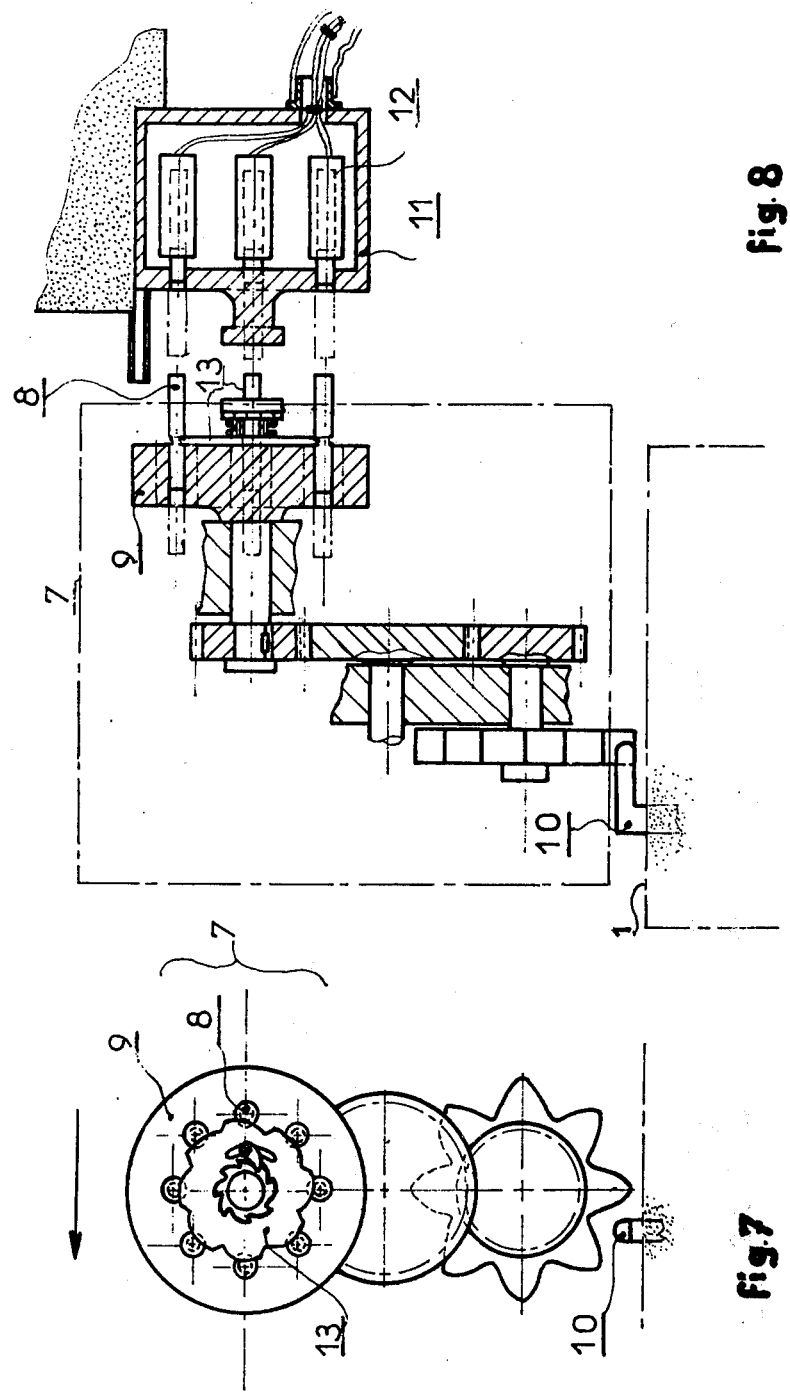

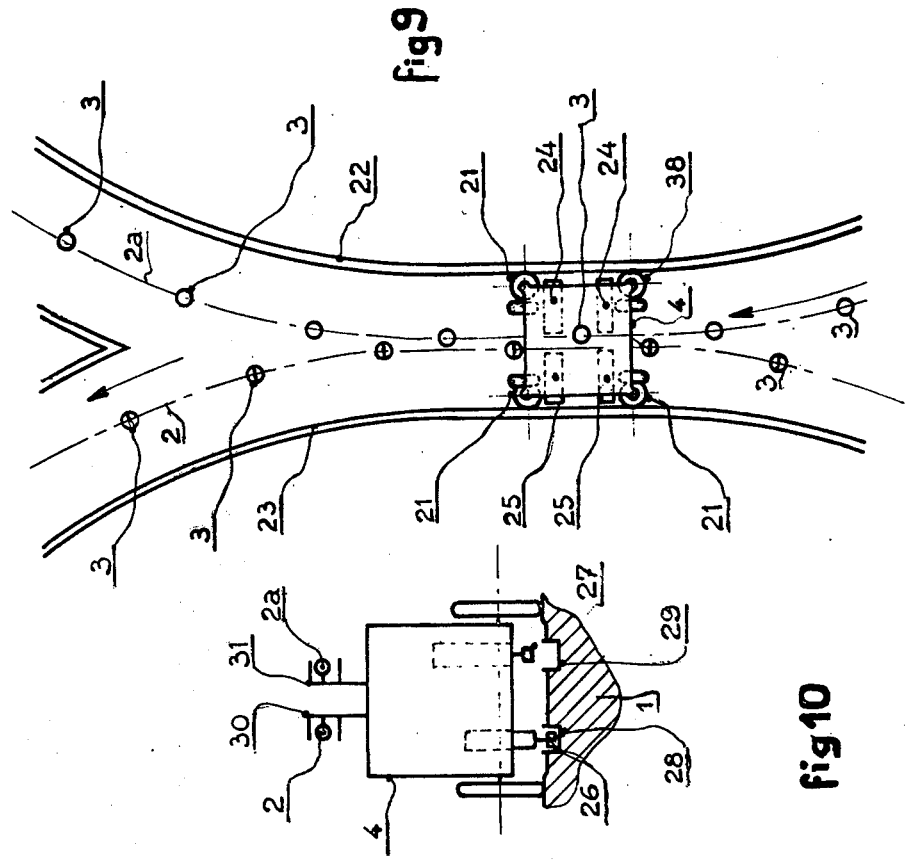
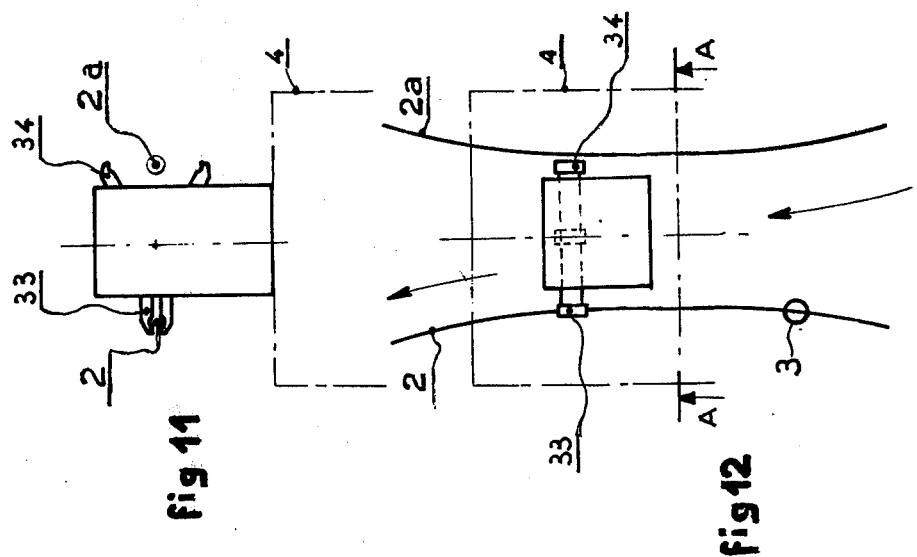

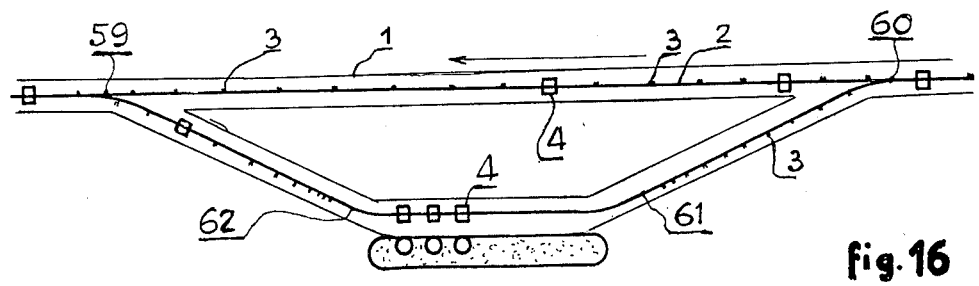
fig. 16
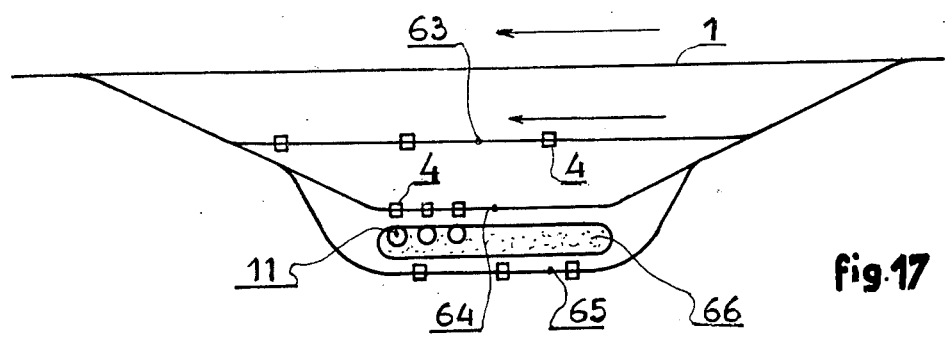
fig. 17
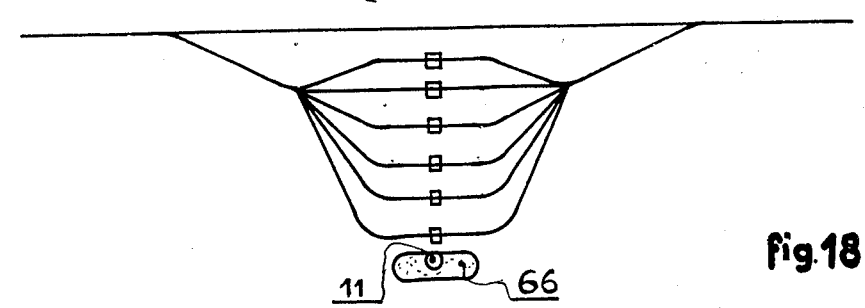
fig. 18
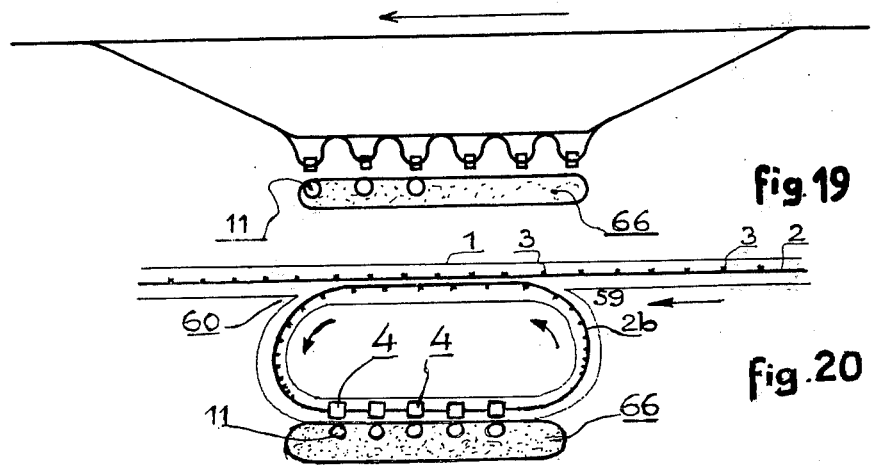
fig. 19
fig. 20

METHOD FOR THE OPTIMIZED TRANSPORTATION OF PASSENGERS OR OBJECTS

The present invention relates to a method for the automatic transportation and distribution of passengers and/or objects. More particularly, it relates to a special traffic network designed and equipped in such a way that the vehicles are sent, from stations or goods yards, to their final destination in continuous manner, without any intervention by the possible passenger. The itinerary is called optimised, that is to say selected automatically, before departure, as a function of the sections of the network which have not reached, at the desired and calculated moment, a certain saturation threshold, and this, whilst respecting the minimum time of the journey.

The methods, known until now, for serving an area by means of vehicles, relate especially to urban transportation. However, all these are for passengers who, at one moment or another, will have to make decisions and act thereon, even if only at interchange points. They do not permit the despatch of packages or unaccompanied children, for example, from one station to another station. On the other hand, when these methods are for optimising the journey, that is to say to gain time, taking congested zones into account, they advocate the interrogation, in the course of movement, of a central computer constantly informed of overloads observed in certain parts of the network. The vehicles are then provided with laborious and complex means of communication while running, with this computer which is fixed.

Thus the various solutions of so-called continuous transportation, such as a system of improved conveyor belts, oblige the traveller to travel, at the right moment to the interchange points between the different belts at synchronized speeds. On the other hand, the track of a continuous conveyer belt can withstand neither successive curves which are too frequent, nor turns which are too short, sometimes imposed by the needs of the site. Finally, these solutions offer no comfort on long journeys.

So-called discontinuous methods such as trains of wagons drawn by locomotives or self-driven vehicles for transportation in common, in spite of their long experience, provide no practical solution of the problem of interchanges at certain stations. The waits can be long.

Between these continuous and discontinuous methods, intermediate solutions have been devised. They individualise the means of transport. The vehicle (improved current automobile) may, after a free travel, enter a special network where it is taken in charge, with the aid of automatic guide means, by a central computer. This means of optimising the itinerary in urban zones entails a certain number of drawbacks. The use of a road automobile, even improved, necessarily involves supplementary complex accessories: slaving at the wish of the management to the needs of collective radiocontrol, servocoupling of speed in parallel or supplementing the road engine, devices permitting the exchange of data on route with a central computer (fixed cables and sliding contacts, radio, etc . . . ) sensitive to the environment), entry into the controlled circuit with delicate manoeuvring, and especially exit from said circuit with the requirements of parking whose importance is difficult to predict since the circuits are open, (entrance and exit at will). As a consequence the single vehicle with two different uses renders such a solution irrational.

It is an object of the invention to provide a method which enables these drawbacks to be avoided in spite of the high density of the lines which may constitute the network.

Other objects and advantages of the method according to the invention are enumerated below.

The route, previously programmed between two stations of the network, is followed by the vehicle, in continuous manner, without being subjected to congestion (fastest route, and not necessarily the shortest), whilst respecting accurately at all points of the journey the time tables provided by the central computer, and this, without other communication with the latter, than that the vehicle has, prior to its departure, to select the station of destination and to receive the single indication of the route to follow.

The vehicle designed for the network goes from any one station to any otheer, via an optimised itinerary, without intervention of the passenger or without a passenger. That is to say the transportation unit can route merchandise, unaccompanied children, elderly persons, etc . . . and this, automatically, by the optimised route, that is to say in the shortest possible time.

The possibility is derived therefrom of producing the circulation, automatically and without impediment, of empty vehicles to balance and to redistribute between stations the stocks of waiting vehicles.

The changes in the sections of traffic, to branch routes, are made at the moment provided for without risk of collision, nor delay resulting from the reservation of space in a part of the circuit.

The path of the lines can include very sharp turns, which are then designed to a set value; the network can easily match the geography of the site. As a function of the latter, and at each point of the network the speed of the vehicle is determined with precision. This characteristic permits also and in particular a forecast plan to be memorised without error. The forecast and financial management of the vehicles, over the whole of the network, becomes simple. It is resolved with accuracy, by means of an ordinary computer.

The means of transport is personalized. It can be as simple as a towed, rolling (or sliding) platform. The vehicles may be driven by any means of collective or individual propulsion. They can be rolling, sliding, floating or suspended from a cable. The network can be aerial or subterranean, or at the surface, or combined.

The method according to the invention, is characterised, at the same time, by the construction and equipment of the network traversed in a certain manner by guide marks, the method of piloting vehicles with respect to said movable marks, including here the rekeying device at the exit from the divergent stretches (exit from branch lines) and the successive devices on board or on the route, which permit the vehicles to follow in continuous manner the optimised itinerary imposed before departure by the central computer. Vehicles and computers are not in communication during the journey. The optimised itinerary takes into account sections of the network whose maximum load is reached at the moment when the vehicle should traverse them.

In order that the invention may be more fully understood, the description below includes certain embodiments and described in conjunction with the accompanying drawings, given by way of purely non-limiting examples.

In the drawings:

FIG. 3 is a diagram of a convergent-divergent assembly (common zone), with lines of movable reference marks.

FIG. 4 is another diagram of the same assembly with a reduced common zone.

FIG. 4a shows a sequence of divergent and of convergent stretches.

FIG. 7 shows a view from above of the programmer with its device of control at each divergent stretch.

FIG. 8 shows a section of the programmer with its control, in front of the station fixed to the platform setting the program.

FIG. 9 shows a diagrammatic view from above of an electromagnet guiding device.

FIG. 10 shows a front view of a guidance system on rails with feelers for the reference marks.

FIG. 11 shows a front view of a pincer type marking element feeler with a traction cable.

FIG. 12 shows a view from above of a pincer type feeler.

FIG. 16 shows a diagrammatic example of a route at a station.

FIGS. 17, 18, 19 and 20 show other examples of the arrangement of lines at stations.

Figure 1:
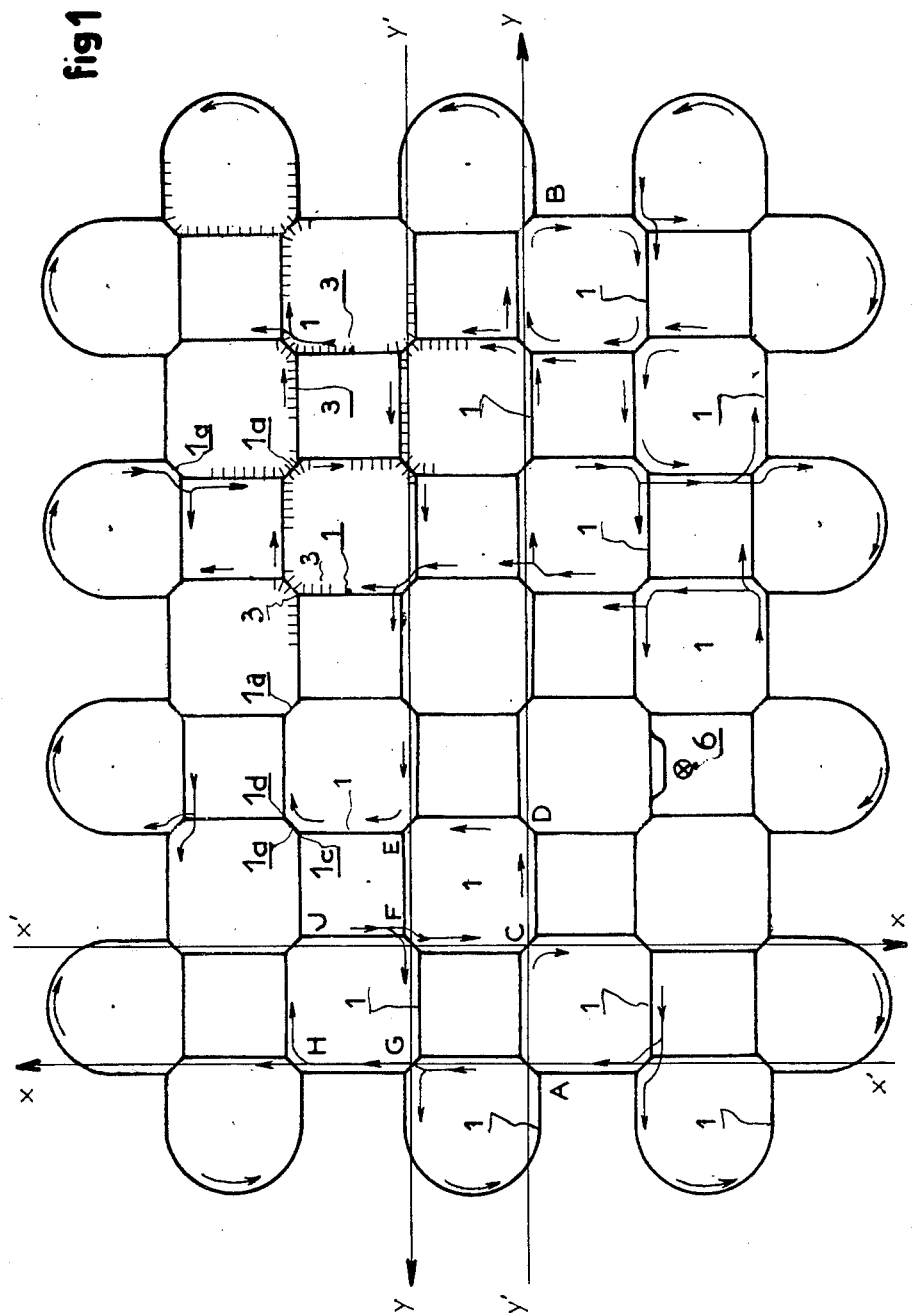
FIG. 1 is a diagram of a possible network with movable reference marking elements or guide marks.

The structure of the network (FIGS. 1 or 2 for example), is constituted by a group of elemental tracks 1, in closed circuit, transversed one way, which tracks have common parts 1a. These common zones (FIGS. 3 and 4) are defined by the fact that they are comprised in the direction of travel between a convergent stretch 1c and a divergent stretch 1d. The name convergent stretch is applied to the point where two tracks approach close to one another and divergent stretch to that where they separate from one another. The network is thus constituted from a succession of convergent and divergent stretches; if necessary, several divergent or several convergent stretches can follow one another.

Upstream of a convergent stretch (FIGS. 3 and 4), two tracks 1 are traversed along trajectories 2 by real or artificial guide marks 3 on which the vehicles become keyed through a servocoupling device. The latter can have the simplicity of a hooking means of which an example is given below. Said reference marks always flow in the same direction on the two tracks, so that at the convergent stretch those of one are shifted with respect to those of the other by at least one vehicle length. These two series of reference marks 3 remain present over the whole of the zone 1a common to the two tracks, with the same speed, same direction of operation, but off-set. One each of the two tracks, downstream of the divergent stretch, and before the counter 5 defined below, these reference marks disappear to leave space for a new series of reference marks corresponding to the following convergent stretch. The vehicles are rekeyed on these new reference marks according to the orders from the counter 5. In certain particular cases, the new series of reference marks are only a continuation of the preceding reference marks. In any case, and no matter at what point of no matter which track and at any moment, the speed and the through-put of the movable guide mark elements 3 are known. These essential characteristics define at the same time the outline of the network and its equipment.

In FIG. 1, by way of example, if the congestion of the tracks permits it, movement is in a straight line from A to B, through sections AC, CD, etc . . . which follow approximately the axis y'y. On the other hand, if it is desired to go from A to F, it is possible to pass through the sections AC, CD, DE, EF, or AG, GH, HJ, JF. The computer will select the itinerary which is at the same time the fastest and not saturated at the moment of passages of the vehicle. Stations such as 6 are arranged on parallel branches or special closed circuit tracks. This example of a network is geometric. The distance between two consecutive branches (CD or EF, etc . . .) or the distance between a divergent stretch and a convergent stretch, will be called below a section.

Figure 2:
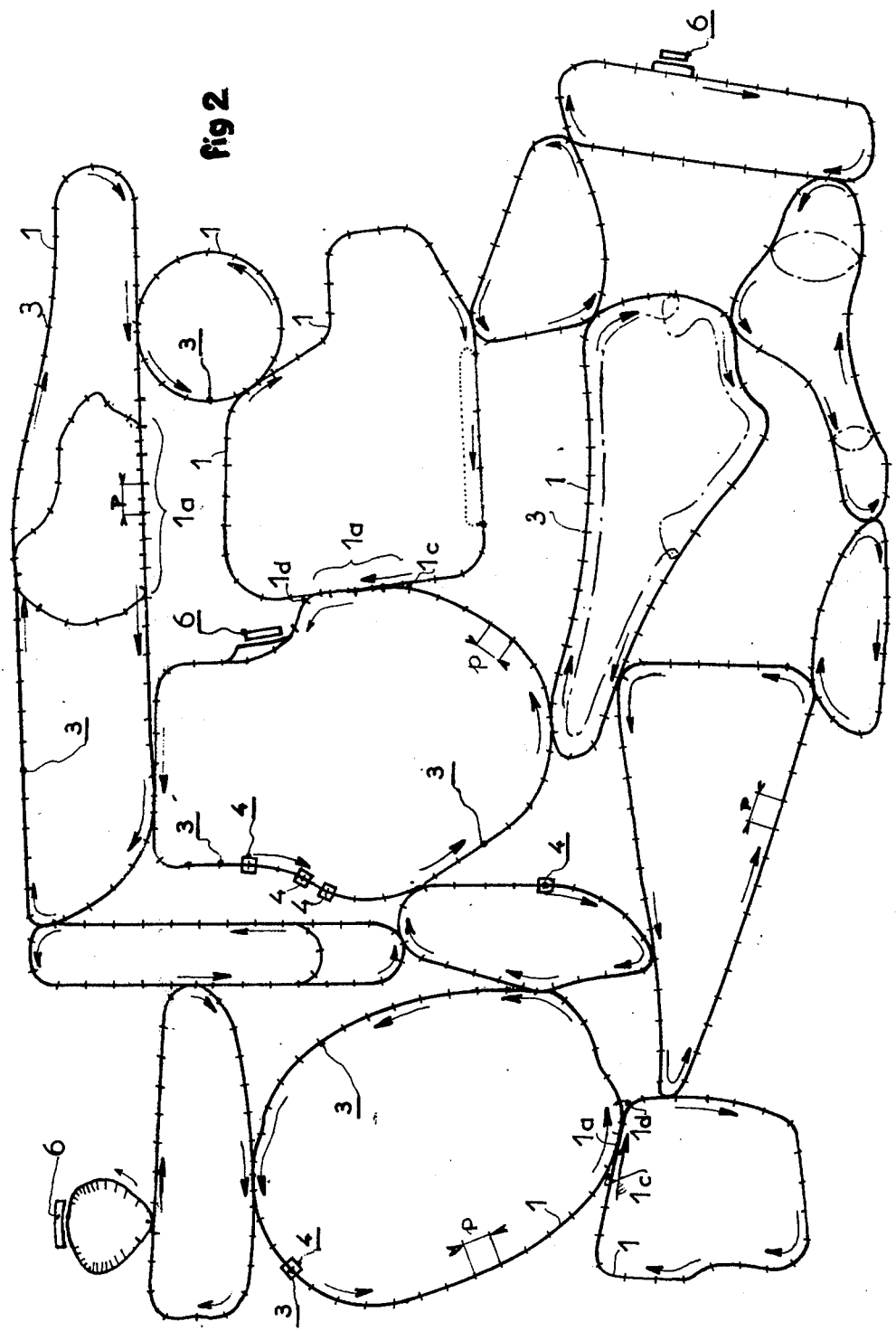
FIG. 2 is another network diagram, with different speeds and with the path adapted to the site.

FIG. 2 shows a network constituted of tracks in closed circuit traversed, one way, with the same characteristics as above, but whose shape follows the geographical conditions of the site. Other combinations may be used such as those sketched in FIG. 4a.

It has been seen above that the reference marks 3 flow along lines 2 in a well-defined manner. By way of example, these reference marks 3 can be rings fixed to a flexible cable 2 of small diameter, which cable follows the traffic route at a predetermined speed. They can also be constituted by light spots moving over a translucent strip, the length of the route. Also, this can be a characteristic wave guide moving over a catenary (or in windings), traversed by a modulated current, or artificial or real reference mark objects, driven by a hydraulic or pneumatic flow, or by any other method.

Hooked or keyed onto these movable reference elements 3 by their servocoupling device, the vehicles 4 do not occupy them all, if the line is not saturated. They can change route, hence line of reference marks, to branch lines (common zone of flow) according to the optimised itinerary that they must follow.

Referring again to FIGS. 3, 4, it is seen that on each of the tracks, in the common zone 1a, the speed of all the reference marks in the same (V) synchronized as required. Said reference marks are equidistant by the same step p on each of the two tracks. Flowing in the same direction, they are shifted from one track to the other, so that they do not occur opposite in the said common zone, the shift being at least one vehicle length. These three identities (pitch, speed, shift) are realised on the two tracks upstream of the convergent stretch, and are preserved during travel corresponding to the common path 1a, then over a certain distance after the divergent stretch, more precisely, upstream of the counter 5 defined below. At the level and downstream of the latter, the speed and the pitch on each divergent branch are those corresponding to the following convergent stretch and may or may not be different (FIG. 4a). Consequently, there is no general synchronization of the network, but only partial synchronization two by two of the convergent tracks between themselves.

It will be easily understood, that if the speed of the reference marks over a predetermined section of the network is fixed from a base speed V, it can be modified in the course of use of the network, on condition that the computer is informed in advance of this modification and that it takes this into account in its setting-up of routes. In the same way, and by extension, all the speeds can be modified overall in the same proportions.

In the common zone 1a, the possible passage of a vehicle from one reference line to the other is done at the same time as the change in track (that is to say at the same time as the change in guidance of the vehicle). Said vehicle will find itself again at the exit of the divergent stretch, between two reference marks. It will be rekeyed on a reference mark by a so-called rekeying device and at the order of the counter 5. This operation effected on each section is explained later by means of FIG. 15.

Knowing the one or more speeds of all the reference elements, it will be possible to define in forecast, before departure, the position of all the vehicles on the network or more exactly on a representation (simulator) forming part of the computer.

Successive changes in routes (and of lines of reference elements) to branch lines are provided, before departure, by the computer and set on a programmer forming part of a device mounted on board. The method according to the invention, hence assumes that the vehicle is capable, without intervention of either passenger or of a central remote control station, of defining according to the order from the programmer and before each branch, the left or right track that it will take or keep to. If there is a change of track, the order will only be executed in the common zone, since at the same time, it causes a change in line of reference marks, hence a break in servocoupling to the reference mark which has piloted said vehicle over the section that the latter has just traversed.

Figure 5:
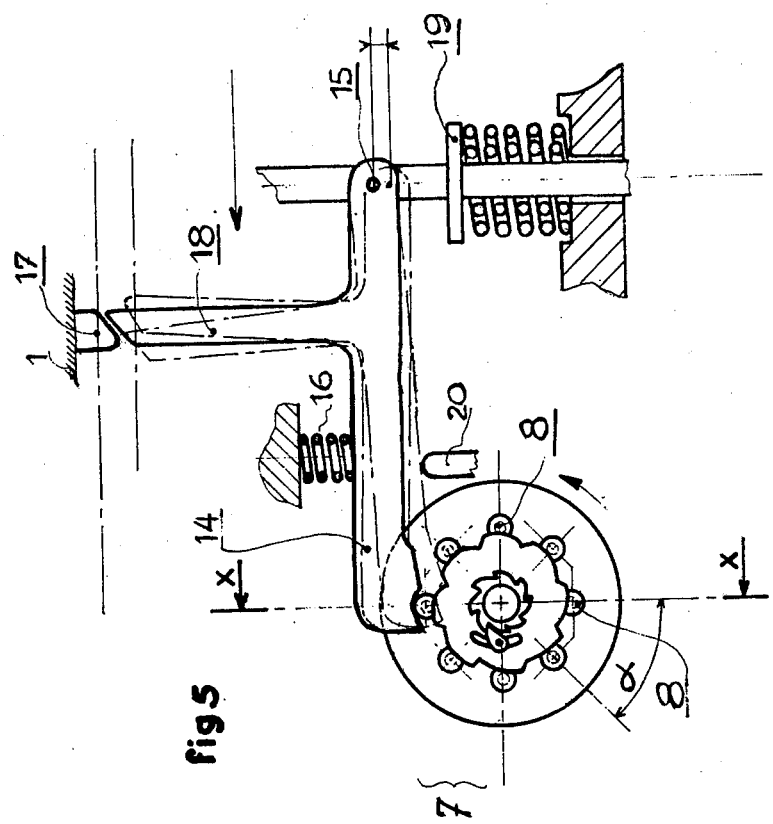
FIG. 5 shows a diagrammatic view from above of the programmer and of the device for change of guidance and line of reference marks.
Figure 6:
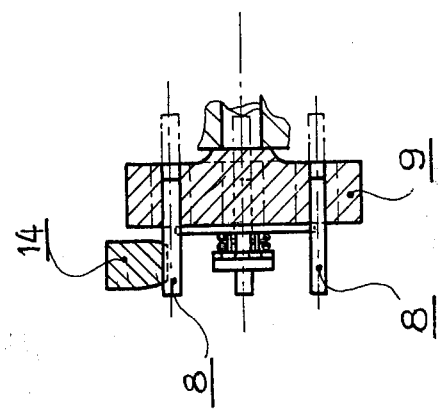
FIG. 6 is a partial section along the line xx, of the programmer on board.

By way of example, a mechanical device, mounted partly on the vehicle and shown in FIGS. 5 to 6, enables the achievement of this purpose; it comprises a programmer 7 on the vehicle, a lever and pin system on the track. The programmer 7 has received from the computer, before departure, the data on its itinerary. It possesses pistons 8 mounted in a circular plate. The latter rotates through an angle α at each section. After each branch, a pin 10 fixed on the track causes this rotation mechanically or electrically. Each of the pistons 8 corresponds therefore to a predetermined branch, for a given route. Prior to departure, said pistons are placed in exit or entry position, according as the vehicle must change or not it track or line of reference marks, at the corresponding branch. To do this, a station 11 (FIG. 8) mounted on the platform is coupled to the programmer and, positions said pistons 8 due to plunger cores of electro-magnets 12, for example, themselves receiving orders from the central computer. There are as many plunger cores 12 as pistons 8. In the approach and withdrawal movement, either at the station 11, or at the programmer 7 (which movement is indispensable for departure, caused by the insertion of a ticket for example, or by the direct action of the passenger), unlocking is produced then locking of the pistons 8 by means of a device 13 (rotation of a notched wheel in grooves formed on the pistons).

The setting of the itinerary on the programmer being thus effected, the vehicle departs. Each of the pistons 8 is in withdrawn or extended position, opposite a lever 14 (FIG. 5), pivoted at 15 on a part of the vehicle. Said lever pushed by the spring 16, is or is not supported by a piston 8. In the first case, when the vehicle enters the zone common to two tracks (junction), a pin 17 on the track, will oblige it through its appendix 18 to push back its pivot pin 15 and thus to operate the device 19 for changing track and changing line of guide marks. In the second case, the lever being inclined to its stop 20, the fixed pin 17 will have no action on the device and the vehicle will follow the same line of guide marks.

Any other electrical, pneumatic, hydraulic, electronic or magnetic device fulfilling the same successive functions, may be used. The fixed pins 10 and 17 may be optical signals (photoelectric cell) or magnetic or other signals. In summary, the programmer receives at the station, the program from the computer, conditions over each section the device for changing track and lines of guide marks, which device only executes the order on the signal 17 at the entrance to the junction. In certain cases, the preparation and execution of the order can take place at the same time in the common zone of the tracks.

Figure 14:
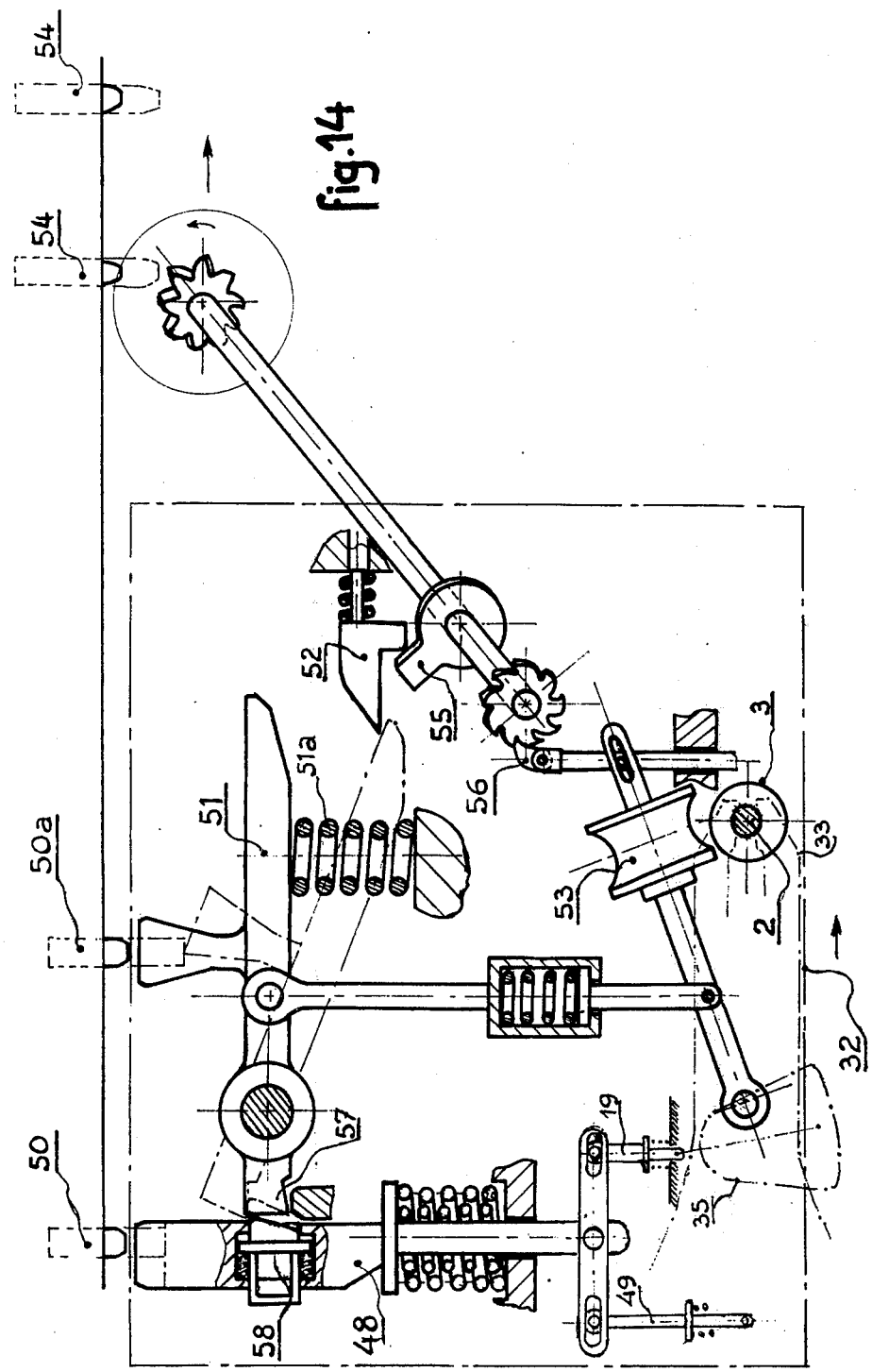
FIG. 14 shows a diagrammatic view from above of a rekeying system with n steps.

The pusher 19 (FIG. 5) controls at the same time a change in track and in lines of guide marks. It returns to its original position after its depression. Vehicles rolling on the ground or gliding over water or on snow can be guided by lateral rollers 21 (FIG. 9) which are supported either on the metallic strip 22, or on the strip 23, according to the supply of the electromagnets 24 or 25. The pusher 19 (FIG. 5) causes the change in supply of said electromagnets. For vehicles running on tracks such as shown in FIG. 10, it is also possible to act directly on the rollers 26 and 27, which are engaged in the rails 28 or 29, according to the direction to be taken. The same devices may be suitable for vehicles rolling suspended on overhead rails. In all these examples, two ropes 2 and 2a (FIGS. 9, 10) bearing the guide mark elements 3 of one track or of the other, form the movable lines of these guide marks. The later pass either above, or below, or at the sides of the vehicle. Two similar and symmetrical devices 30 and 31 operating alternately, such as feelers (mechanical, optical, magnetic or the like), permit the guide marks on one or the other line to be detected and followed. Each time that there is a change of route (action of the pusher 19), there is also a change of the feeler device. That is to say the servocoupling of the vehicle to its guide mark of line 2a (for example) discontinues its action; consequently, the said vehicle is rekeyed on one of the guide marks of line 2, due to a rekeying device 32 (FIG. 14) explained below by means of FIG. 14. As soon as the latter has positioned the vehicle on the selected guide mark, vehicle and guide mark become inseparable until a change of route. The traction of the vehicles, collective or individual, is servocoupled by any known method to the real or artificial guide mark (detection and engagement with wave guide).

Figure 13:
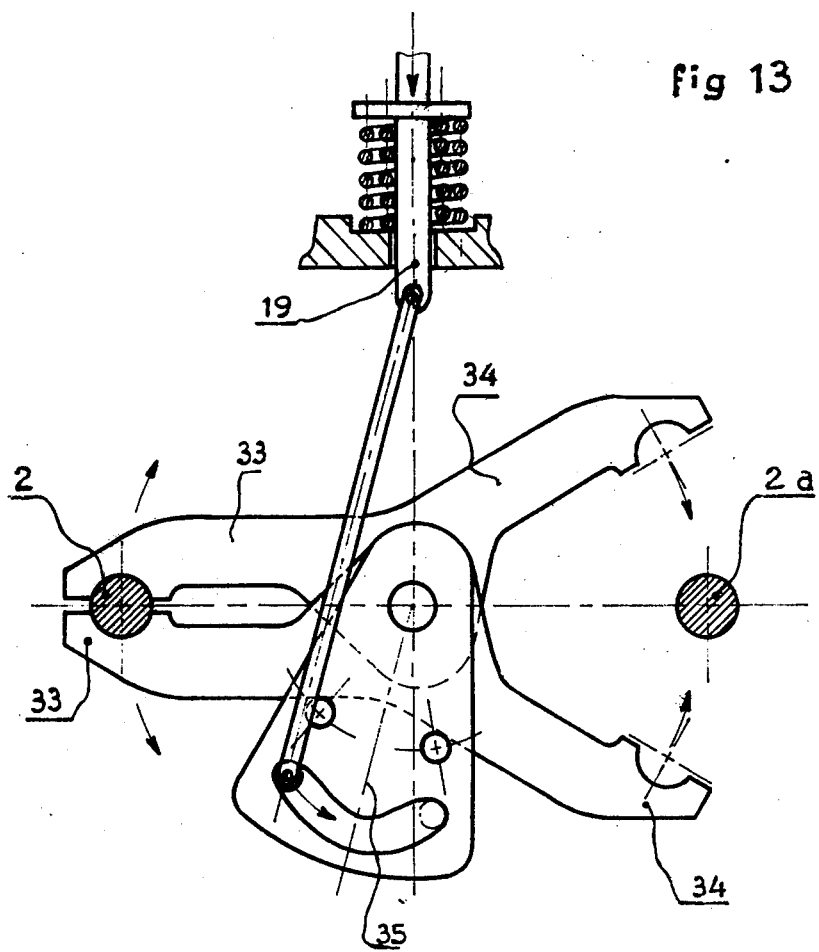
FIG. 13 shows a front view of a pincer system for cables or lines of reference elements.

For example, the feelers may comprise pincers 33 and 34 (FIGS. 11 and 12) which by gripping the cable, 2 or 2a, permit the latter to tow the vehicle, which then has no motor of its own. On each track, the line of guide marks and the collective means of traction then become common (this is also the case in cabins of telepheriques). The rings constituting the guide marks push the vehicle until a change in route, where the pincer 34, 33 opens. FIG. 13 shows how the pusher 19 actuated by the programmer 7 operates alternately the jaws 33 or 34 by a push-pull system 35. Each time that a pincer 33 is released from a line 2 (hence from a guide mark 3), the other pincer 34 temporarily clamps on the other cable, between two guide marks of line 2a. The rekeying device 32 then plays its role, on the latter.

Figure 15:
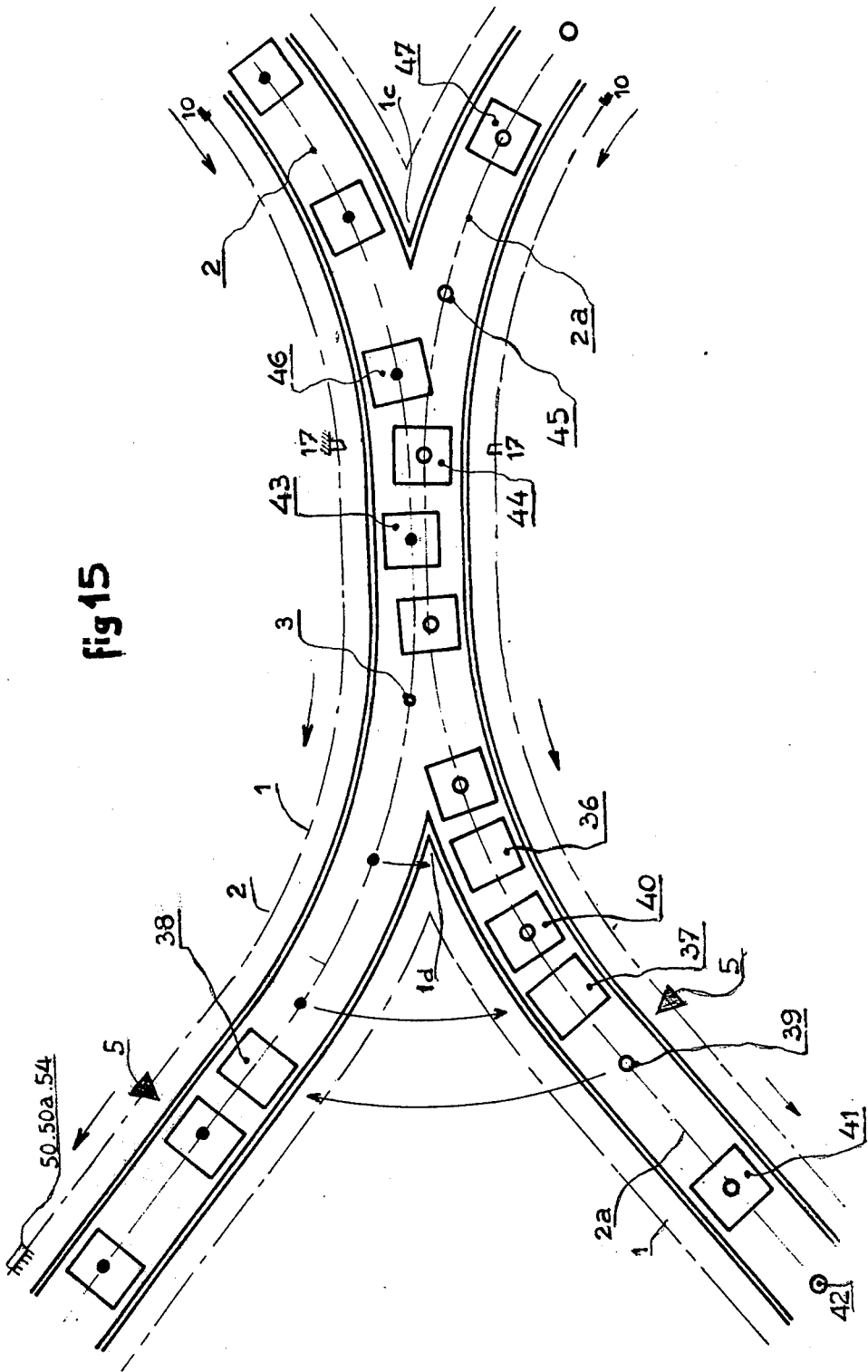
FIG. 15 shows a diagram of a zone common to two channels, with distribution of the vehicles and rekeying.
Figure 21:
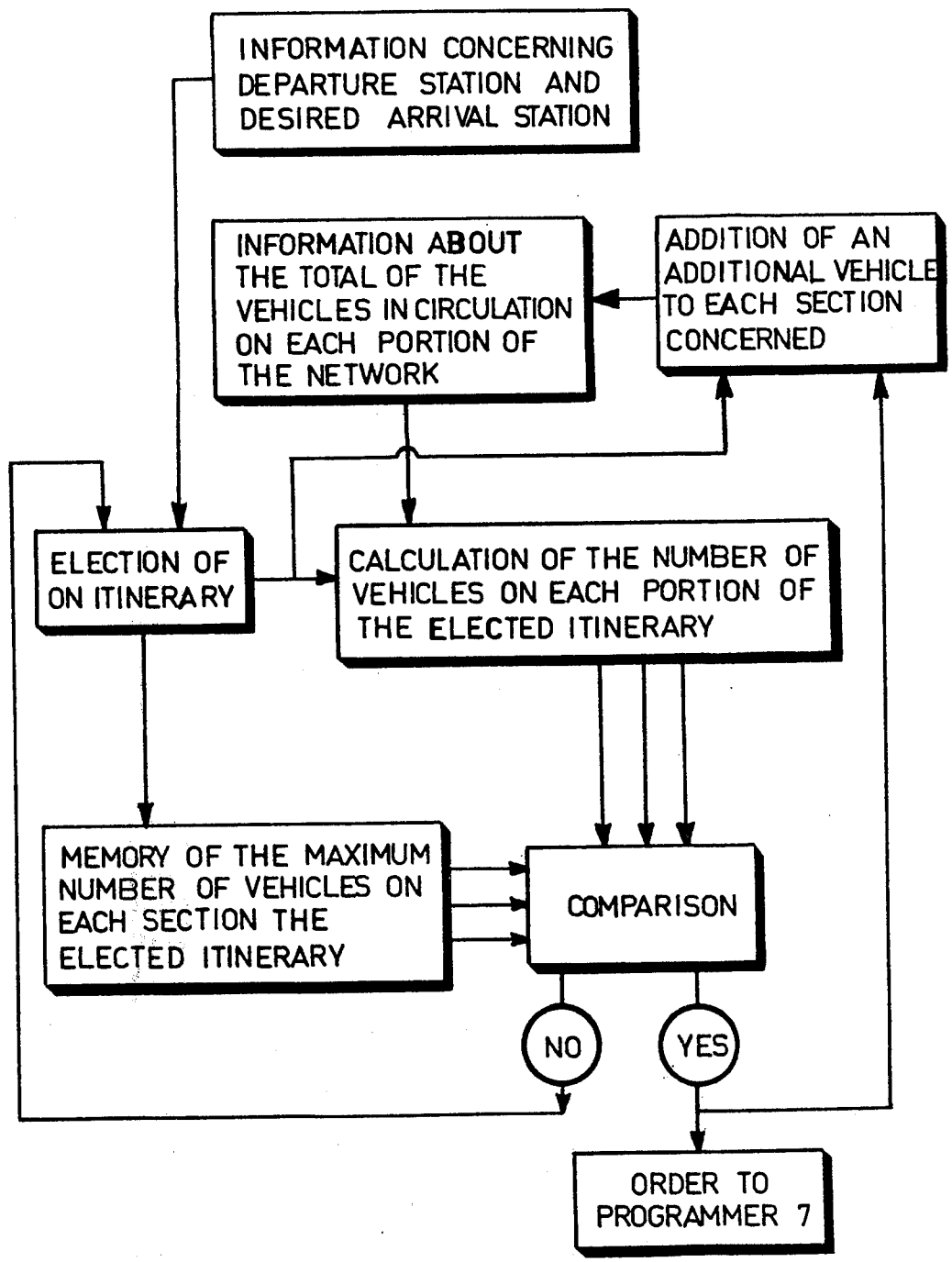
FIG. 21 is a schematic view showing the function of a computer in the system.

Whatever the means of towing the vehicles and of keying on the guide marks, it will be understood that it is easy to require one or several of said vehicles to advance or to withdraw to the neighboring guide mark on a section. As a general rule, by a preset signal, emitted from the track (signal or pin) and collected by the vehicle, temporary interruption of the servocoupling to the guide mark is caused and the acceleration or retarding of the vehicle ordered, until it encounters another guide mark on which said servocoupling again fulfills its function. It is even possible thus to jump over several guide marks, on condition of course, that they are not or no longer occupied. It is on this principle that the rekeying device 32 is based (FIG. 14) which will be described below. The example selected contemplates vehicles drawn by traction cable on each track, which cable bears the guide marks. In this case, there are two other auxiliary traction cables parallel to the line of guide marks. One is at faster speed than the latter and the other at slower speed, or mounted on braked free pullies. They accelerate or brake said vehicle by means of a set of auxiliary pincers, moved by the signal of advance or withdrawal by one or several steps. FIG. 15 shows an example of a given situation at a junction before the convergent stretch 1c. All the vehicles are keyed on their guide mark. After the divergent stretch 1d certain elements are passed from line 2 to line 2a and reciprocally. This is the case of vehicles 36 and 37 on the line 2a, and 38 on line 2. They are temporarily not on a marking element. At 5, a counter is located on each track, soon after the divergent stretch. It counts on each line, the empty marking elements, the vehicles coming from the other line (situated between the marking elements), and the vehicles already keyed on a marking element. It is constituted by an empty guide mark detector and a vehicle detector (photoelectric cells or electromechanical system). The detection of an unkeyed vehicle permits it to record one unit ($+ u$); that of empty marking elements causes it to subtract one unit ($-u$). When a vehicle is on its marking element, the counter registers O. These three detections can be counted separately or in combination (the $- u$ and $+ u$ units are added algebraically). Assuming that a vehicle keyed between two marking elements passes in front of the counter 5. If the latter has recorded one (or several) unoccupied marking elements, just previously, it gives the order to the said vehicle (by means of signals or pins on the track) to advance to the next free marking element. If the counter has previously recorded one or several free marking elements, then one or several normally positioned vehicle, it will give the order to the latter to advance by one step, then make the vehicle keyed on the neighboring marking element which has become free to advance. The operation can take place as soon as the interkeyed vehicle passes in front of the counter.

On the passage of an unkeyed vehicle, if the counter has previously recorded a number of vehicle sufficient to occupy all the preceding marking elements, it will give an order to the new vehicles passing to brake by one step, and this, for all the vehicles positioned in front of the next empty marking element. This enables the marking element which follows the interkeyed vehicle to be freed, in the same way, if n successive vehicles present themselves inter-keyed, the order to brake (or to pass to a lower speed) will be given to the vehicles following until the n overcrowded vehicles have found n free marking elements, that is to say when n empty marking elements will have passed in front of the counter. The number n can not be large since the computer can not exceed a certain threshold of occupation of the marking elements on the section.

In the example selected (FIG. 15) on passage in front of the counter 5, the vehicle 37 will receive the order to advance to 39. When 36 has passed in front of the counter, the vehicles at 40, 39 and 41 will receive the order to advance by one step (41 to 42), to free the marking element previously occupied by 40. If the vehicle 43 changes track, 44 (if it remains on the same track) will rekey on 45, leaving to 43 its previous marking element. The braking or accelerating order can be given as soon as the vehicles will have passed in front of the counter, knowing that necessarily one or more empty marking elements will come, as a result of the intervention of the computer. If in the interval of time, the vehicle 46 changes route, it will also receive the order to brake, the same as 47. The example relates especially to brakings. In other cases, accelerations will be ordered. The orders to advance relatively, in the same way as those to withdraw, can be given to the vehicles immediately on passage in front of the counter. The relative orders to advance or to fall back are manifested by a temporary stopping of servocoupling of the vehicle to its marking element, and by braking or acceleration, until the detection by an auxiliary feeler of the one or more marking elements preceding or following.

The improved device 32, mounted on the vehicle (FIG. 14) can even permit withdrawal or advance by several steps. The pusher 48 frees the servocoupling of the vehicle to its marking element. In the case of towing by cable, it acts on the piston 19 and the jaws 33 and 34 (FIG. 13). The same pusher brakes the vehicle by the device 49 which, in the same example, acts on the corresponding auxiliary pincer. The same device accelerates the vehicle concerned. It will rekay the vehicle on a marking element at the second push; it frees it at the third, etc . . . the cams or pushers 50 and 50a mounted on the track act on the passage of the vehicle under the indications from the counter 5. They give the order to release the vehicle from its marking element (by 50) and to count the number of marking elements to be jumped over (50a). The lever 51 is lowered and is held by the elastic stop 52. It places the auxiliary feeler 53 in contact with the cable 2. If the counter 5 demands n marking elements to be jumped over, it will order at the same time n movable fingers 54 to emerge on the track. Through this fact, the cam 55 on the vehicle will turn through n steps to the left, the catch 56 being disengaged downwardly as a result of the lowering of 53. Said catch will be raised each time that 53 senses a marking element 3, during the running of the vehicle. After the passage of n marking elements, the cam 55 will push the stop 52 and will free the lever 51 which, under the effect of the spring 51a, will thrust against the pusher 48, hence on 19. As has been seen previously, the pincer 33 will then rekey the vehicle on the good marking element. The pusher 48 is depressed under the pressure of the lever 51, by means of the tooth 57 and of the elastic pawl 58. The latter reascends with the pusher 48 as soon as the lever 51 is in its horizontal position. The device is then ready for a further rekeying operation after another junction.

For a zone of track comprised between a divergent stretch and a convergent stretch (section) the maximum quantity Q of marking elements over which a vehicle can be unkeyed by slowing down or acceleration is determined by the length of said section as well as by the minimum, maximum, and average speed V in this zone. This quantity Q defines the number of vehicles which can be at one moment on a given portion of route, which number is in fact limited by the computer.

The real quantity q of marking elements by which the vehicle can be rekeyed between a divergent stretch and a convergent stretch is fixed by the counter 5. It is necessary that the amount (q) by braking should be equal to that by acceleration, that the counter be reset systematically to zero after the passage of 2xq marking elements (whether occupied or not) and that the unit of time of the computer be equal to the time of travel over a length equal to that normally occupied by 2xq marking elements, at the average speed V, of the track concerned. In this way, the real position of the vehicle never departs from the predictions of the computer, whatever the number of junctions traversed.

The unit of time of the computer is the period which separates two consecutive predictions on the future situation of the vehicle over the whole network.

It is possible, after having defined the itinerary of a vehicle keyed successively on the marking elements (at known speed) belonging to the tracks followed, to predict with accuracy the time necessary between the departure station and the destination station. Moreover, at each predicted unit of time, (by simplification, we consider this as a minute in the explanation which follows), it is possible to locate any vehicle on a representation of all the sections of the network, which representation is called a simulator. It is there that the role of the central computer commences. It sums in the future, minute by minute, the number of vehicles predicted in line over each portion of the route, that is to say the number of marking elements to be occupied. The maximum saturation Sm will be achieved, when all the said marking elements of a portion of route will be occupied at a given minute. In fact, the threshold above which the vehicle will be directed to another section will be less than Sm, to take into account certain essential, that is to say: expedition by the computer of artificial vehicles to lighten the traffic density in certain zones, at certain predicted moments; a safety margin to take into account possible urgencies taking the shortest path.

The traffic of empty vehicles to balance the stocks of vehicles between stations (on the orders of the computer which can know the number of vehicles waiting at each station), as well as their travel for despatch to the maintenance workshop, are treated like loaded vehicles; the only difference being, that their departure and their destination are handled directly by the computer.

The computer receives the information concerning the departure station and the desired arrival station. The desired arrival station may be indicated in a known manner such as, for instance, pushing a control or introducing a coded ticket into a reader (not shown). The computer starts by examining the most rapid itinerary (maximum number of sections, for example) and calculates for each section of the elected itinerary the number of vehicles. It compares the number of vehicles to the preset maximum number of vehicles in the concerned section, the maximum number being kept in the memory.

If one of the sections of the elected itinerary has reached a maximum threshold, the computer than examines another itinerary a little longer and so on until a non-saturated path is obtained. Then the computer transmits the data to the programmer of the vehicle 4 before the departure of the vehicle. At the same time, it brings up-to-date the simulator by adding for each provisional unit of time one supplementary vehicle to the totalization of the corresponding route.

It recommences the operation with respect to a new request from a user and so on. Its simplicity also permits it to manage the economics of the network, to provide a certain amount of statistical information, and especially to ensure the automatic and programmed flow of empty or artificial vehicles, to distribute stocks, to ensure maintenance and to avoid any holdup (in the case of crowding of short duration).

Stations of the type of FIG. 16 can include a track parallel to the main track 1, with a convergent stretch 59 at the exit and a divergent stretch 60 at the entrance. These junctions are treated like common zones between two tracks and subject to the orders of the previously delivered program. The part 61 of the branch is a braking zone (by friction, or by electrical means or by a slope or by any other means). The part 62 is a zone of controlled acceleration.

The vehicles only depart when an itinerary is available, taking into account the time of acceleration and of transit. One station can advantageously be also a combination of reduced tracks with lines of marking elements 26, whose speeds are progressive up to the value of that of the main track (FIG. 20).

A station comprises preferably three lines of vehicles (FIG. 17). The line 63 is a reserve in which the computer obtains empty vehicles to send them automatically into other depleted stations. The two other lines 64 and 65 can be indispensible in order that the vehicles do not collide on braking. The vehicles are alternately directed to one and to the other, around platforms 66. On the departure platforms fixed posts 11 are arranged, already described above, for serving as an intermediate between the computer and the stopped vehicle. In addition, it includes a connecting device between the computer and the user in order that the latter may communicate to it the desired destination station. FIGS. 18 and 19 give by way of example other diagrams of lines of stations.

As has already emerged from the foregoing, the present invention is not limited to the embodiments, or to the nature of the different means applied, mentioned above. It encompasses, on the contrary, all possible modifications on condition that they do not depart from the scope of the claims.

It is again recalled that the volume, the mode of movement and the propulsion means of the vehicles do not come into consideration according to the invented method. Notably, on the same network and with the same equipment, it is possible to use, simultaneously, vehicles of different functions, such as: a vehicle of small space having the functions of a taxi from station to station; a vehicle of medium capacity having the same functions as "Mexican Peseros" (that is to say, from a same departure point, routing to several destinations, or taken in the course of transit by other passengers for a distination situated on the preorder transit); vehicle of high capacity running at a time programmed in advance, on predetermined journeys like buses. This diversity in the type of vehicle permits good use of the loading capacity of the network, and easy management.

The method according to the invention has therefore particular applications like that specified above. It can also be used to optimise handling of packages in a complex network. More generally, it serves in networks of urban transportation, enabling adults and children to be routed by individual vehicles, without worries at interchange points. The applications relate just as well to subterranean, aerial (telepherique) or surface urban networks.

It envisages the use of all types of vehicles, on wheels, suspended, on water, on snow, on ice, etc . . . whatever their mode of locomotion (linear motor, individual motors, collective towing, etc . . . ).

I claim:

1. A method of transporting objects from plural starting points to plural final destinations in a continuous manner and always in the same directions, said method comprising the steps of providing a network of routes including several one-way closed circuit routes, arranging said routes to have convergent and divergent stretches and common zones between said stretches, providing a plurality of vehicles for movement along said routes, providing guide-marking elements and traversing each route in a one-way sense and in a continuous movement, arranging said guide-marking elements in each common zone at controlled spacing desiganted as pitch P and moving said guide-marking elements at a controlled speed V, keying said guide-marking elements to said vehicles by a servo system during the movement thereof over said routes, providing said vehicles with means permitting changing of said guide-marking elements, shifting said guide-marking elements in said common zones from one route to another and utilizing said guide-marking elements as pilots for said vehicles, providing said routes with counter means fixed at an exit from each of said divergent stretches for detecting positions of vehicles with respect to said guide-marking elements and controlling said servo system for resetting the keying of said vehicles on said guide-marking elements, providing said routes with fixed signal means for executing at selected moments orders to change routes of said guide-marking elements, providing said routes with means for executing rekeying of vehicles with said guide-marking elements upon command from said counter means, calculating the number of vehicles anticipated per section of said routes for each selected unit of time, prior to the departure of each vehicle from its starting point fixing the itinerary of said vehicle in accordance with the anticipated congestion of vehicles, and utilizing said counter means and said fixed signal means to follow said fixed itinerary.

* * * * *